United States Patent
Liu et al.

(10) Patent No.: US 9,793,938 B2
(45) Date of Patent: Oct. 17, 2017

(54) INTERMEDIATE-FREQUENCY ANALOGUE-TO-DIGITAL CONVERSION DEVICE

(71) Applicant: ZTE Corporation, Shenzhen (CN)

(72) Inventors: Wei Liu, Shenzhen (CN); Yajuan Duan, Shenzhen (CN); Mengbi Lei, Shenzhen (CN); Xiangling Li, Shenzhen (CN); Guojun Zhang, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 182 days.

(21) Appl. No.: 14/440,094

(22) PCT Filed: Sep. 13, 2013

(86) PCT No.: PCT/CN2013/083504
§ 371 (c)(1),
(2) Date: May 1, 2015

(87) PCT Pub. No.: WO2014/067353
PCT Pub. Date: May 8, 2014

(65) Prior Publication Data
US 2015/0295607 A1    Oct. 15, 2015

(30) Foreign Application Priority Data
Nov. 1, 2012   (CN) .......................... 2012 2 0575799

(51) Int. Cl.
*H04J 3/00* (2006.01)
*H04B 1/12* (2006.01)
(Continued)

(52) U.S. Cl.
CPC .......... *H04B 1/123* (2013.01); *H04B 1/0007* (2013.01); *H04J 1/00* (2013.01); *H04J 3/00* (2013.01)

(58) Field of Classification Search
CPC .... H04B 1/123; H04B 1/0007; H04B 1/0035; H04J 1/00; H04J 3/00
See application file for complete search history.

(56) References Cited

U.S. PATENT DOCUMENTS 5,507,022 A    4/1996  Uomoto
5,881,054 A *  3/1999  Tsuji ........................ H04B 1/52
                                                    370/281
(Continued)

FOREIGN PATENT DOCUMENTS

CN    1445932 A    10/2003
CN    102104391 A   6/2011
(Continued)

OTHER PUBLICATIONS

International Search Report for corresponding application PCT/CN2013/083504 filed Sep. 13, 2013; Mail date Dec. 19, 2013.

*Primary Examiner* — Kevin Mew
(74) *Attorney, Agent, or Firm* — Cantor Colburn LLP

(57) ABSTRACT

Provided is an intermediate-frequency analog-to-digital conversion device, including: a gain attenuation module, a gain amplification module, a filter and an analog-to-digital conversion module. The gain attenuation module is configured to perform attenuation processing on a received intermediate-frequency signal. The gain amplification module is connected to the gain attenuation module, and configured to perform amplification processing on a signal that is output from the gain attenuation module. The filter is a variable filter, connected to the gain amplification module, and configured to perform filter processing on a signal that is amplified by a gain amplifier. The analog-to-digital conver- (Continued)

sion module is connected to the filter, and configured to convert a signal that is filtered by the filter into a digital signal. The technical solution solves the technical problem in the related art and achieves the technical effect of improving the universality of the intermediate-frequency analog-to-digital conversion device.

15 Claims, 2 Drawing Sheets

(51) Int. Cl.
  *H04B 1/00* (2006.01)
  *H04J 1/00* (2006.01)

(56) References Cited

U.S. PATENT DOCUMENTS

| | | | |
|---|---|---|---|
| 7,725,079 B2* | 5/2010 | Kim | H04B 1/123 455/114.2 |
| 2003/0174079 A1* | 9/2003 | Soltanian | H04B 1/30 341/118 |
| 2005/0047533 A1* | 3/2005 | Ruelke | H03G 3/001 375/345 |
| 2007/0086547 A1* | 4/2007 | Sobchak | H04L 27/3809 375/345 |
| 2009/0213770 A1* | 8/2009 | Mu | H04B 1/123 370/281 |
| 2010/0119009 A1 | 5/2010 | Pal | |
| 2010/0322361 A1* | 12/2010 | Han | H04B 1/0025 375/345 |
| 2011/0074504 A1* | 3/2011 | Jang | H03F 3/245 330/124 R |
| 2011/0117854 A1 | 5/2011 | Ruelke et al. | |
| 2012/0129480 A1* | 5/2012 | Ruelke | H04B 1/0021 455/296 |
| 2013/0156134 A1* | 6/2013 | Galan | H04B 1/0071 375/340 |
| 2014/0118008 A1* | 5/2014 | Crain, Jr. | G01R 29/24 324/649 |

FOREIGN PATENT DOCUMENTS

| | | |
|---|---|---|
| CN | 102694567 A | 9/2012 |
| CN | 202931288 U | 5/2013 |

* cited by examiner

INTERMEDIATE-FREQUENCY ANALOGUE-TO-DIGITAL CONVERSION DEVICE

TECHNICAL FIELD

The disclosure relates to the field of communication, in particular to an intermediate-frequency (IF) analogue-to-digital conversion device.

BACKGROUND

With the development of communication technologies, the requirements on the number of carrier frequencies of wireless base station products are also increasing. The communication technologies in the related art require more channels, which thus causes that the complexity of a transceiver design continues to increase, and the volume also becomes larger and larger, and meanwhile brings a series of problems, such as the increase of costs and decrease of reliability. Faced with fierce market competition, high integration and simple design have become the development trend of the technology. The requirement of high integration can not only improve the quality and reliability of a product, but also facilitate the development of the platform design.

In order to improve integration, the integration solution in the related art mainly has two forms: one form is radio frequency integrated circuit (RFIC), and the other form is a multi-chip model system (MCM). The two integration forms are described in detail in the following.

The features of high integration and high performance of the MCM technology make chances for the further implementation of miniaturization. The MCM (Multi Chip Model) directly arranges multiple unpacked chips on a single carrier or substrate, and then the multiple unpacked chips are connected through a high conductive metal, and finally a cast or ceramic enclosing technology is used to package the multiple unpacked chips into one module. Since one module contains multiple chips, which not only improves packaging density, but also increases cabling density since the space among multiple chips decreases, thereby greatly improving the performance and reliability of the whole module. The MCM technology can realize component development in a short time under the same integration degree, and therefore, the cost advantage is rather obvious.

The RFIC is a new type of component which appears with the development of the integrated circuit (IC) process since the middle of the nineties, and multiple radio frequency functions are realized on the same substrate. The realization difficulty of the RFIC is rather high and the development period of the RFIC is very long, and the early cost is relatively high, which can only embody cost advantages under an order above 15K products.

At present, in an intermediate-frequency conversion device of a normal receiver, because of the different requirements on bandwidth by a circuit between interfaces of an intermediate-frequency gain amplification module and an analogue-to-digital converter (ADC) in different modes, and since the filter of this part of circuit is normally non-tunable, the application platforms of the receiver are hard to be uniformed, that is, the universality of the receiver is not strong. The construction of the circuit is required to be changed to adapt to different modes and frequency bands, and the uniform of platforms cannot be really realized.

Aiming at the above-mentioned problem, no effective solution has been presented at present.

SUMMARY

The embodiments of the disclosure provide an intermediate-frequency analogue-to-digital conversion device so as to at least solve the technical problem in the related art that as a filter between a gain amplification module and an analogue-to-digital conversion module is non-tunable, there is a need to adjust the circuit constitution of an intermediate-frequency analogue-to-digital conversion device in systems of different modes or different frequency bands.

According to one aspect of the embodiments of the disclosure, an intermediate-frequency analogue-to-digital conversion device is provided, including: a gain attenuation module, a gain amplification module, a filter and an analogue-to-digital conversion module, wherein the gain attenuation module is configured to perform attenuation processing on a received intermediate-frequency signal; the gain amplification module is connected to the gain attenuation module, and configured to perform amplification processing on a signal that is output from the gain attenuation module; the filter is a variable filter, connected to the gain amplification module, and configured to perform filter processing on a signal that is amplified by the gain amplification module, and the variable filter is a filter of which one or more filter coefficients are tunable; and the analogue-to-digital conversion module is connected to the filter, and configured to convert a signal that is filtered by the filter into a digital signal.

In an example embodiment, the device further includes: an SPI control module, which is coupled with the variable filter, and configured to control the filter coefficient of the variable filter.

In an example embodiment, the SPI control module is coupled with the gain attenuation module, and configured to control one or more attenuation coefficients of the gain attenuation module.

In an example embodiment, a differential analogue input interface and a digital output interface are provided on the analogue-to-digital conversion module, wherein the differential analogue input interface is configured to receive an intermediate-frequency analogue signal sent by the filter module, and the digital output interface is configured to send a digital signal which is obtained by the analogue-to-digital conversion of the analogue-to-digital conversion module.

In an example embodiment, the digital output interface is a Jedec Stand 204 protocol version B (JESD204B) interface and/or low-voltage differential signaling (LVDS) interface.

In an example embodiment, the gain attenuation module is also connected to a frequency mixer, and configured to receive an intermediate-frequency signal output by the frequency mixer.

In an example embodiment, the frequency mixer is a frequency mixer in a time division duplex (TDD) or frequency division duplex (FDD) wireless product.

In an example embodiment, the frequency mixer is a frequency mixer in a digital pre-distortion (DPD) feedback system.

In an example embodiment, packaging is performed by using MCM technology or RFIC technology.

In the embodiments of the disclosure, a variable filter is used in an intermediate-frequency analogue-to-digital conversion device; therefore, one or more parameters of a filter may be adjusted according to requirements of a system so as to satisfy different system requirements. By virtue of the embodiment, the technical solution solves the technical problem in the related art that as a filter between a gain amplification module and an analogue-to-digital conversion module is non-tunable, there is a need to adjust the circuit constitution of an intermediate-frequency analogue-to-digital conversion device in systems of different modes or different frequency bands, and achieves the technical effect of improving the universality of the intermediate-frequency analogue-to-digital conversion device.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DESCRIPTION OF EMBODIMENTS

The example embodiments are described in conjunction with the drawings as follows. It should be noted that the embodiments and the characteristics of the embodiments can be combined with each other if no conflict is caused.

Figure 1:
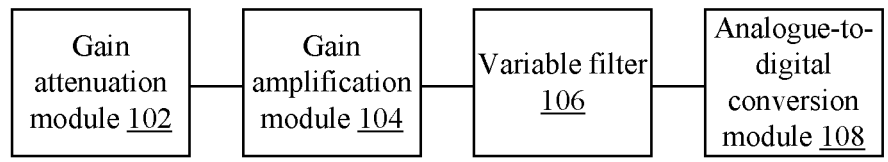
FIG. 1 is an example structure diagram of an intermediate-frequency analogue-to-digital conversion device according to an embodiment of the disclosure.

An embodiment of the disclosure provides an intermediate-frequency conversion device, as shown in FIG. 1, including: a gain attenuation module 102, a gain amplification module 104, a filter 106 and an analogue-to-digital conversion module 108. The structure will be described in detail in the following.

1) The gain attenuation module 102 is configured to perform attenuation on a received intermediate-frequency signal;

2) the gain amplification module 104 is connected to the gain attenuation module 102, and configured to perform amplification processing on a signal that is output from the gain attenuation module;

3) the filter 106 is a variable filter, connected to the gain amplification module 104, and configured to perform filter processing on a signal that is amplified by the gain amplification module, wherein the variable filter is a filter of which one or more filter coefficients are tunable; and 4) the analogue-to-digital conversion module 108 is connected to the filter 106, and configured to convert a signal that is filtered by the filter into a digital signal.

In the example embodiment, a variable filter is used in an intermediate-frequency analogue-to-digital conversion device; therefore, one or more parameters of a filter may be adjusted according to requirements of a system so as to satisfy different system requirements. The embodiment solves the technical problem in the related art of causing the universality to be not strong that as a filter between a gain amplification module and an analogue-to-digital conversion module is non-tunable, there is a need to adjust the circuit constitution of an intermediate-frequency analogue-to-digital conversion device in systems of different modes or different frequency bands, and achieves the technical effect of improving the universality of the intermediate-frequency analogue-to-digital conversion device.

Figure 2:
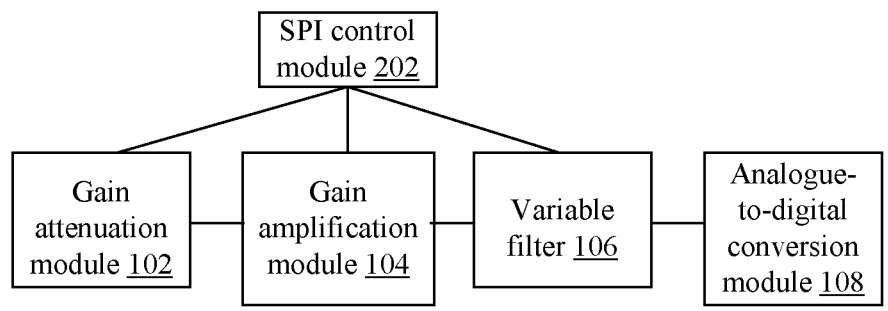
FIG. 2 is another example structure diagram of an intermediate-frequency analogue-to-digital conversion device according to an embodiment of the disclosure.

In an example embodiment, as shown in FIG. 2, the above-mentioned intermediate-frequency analogue-to-digital conversion device further includes: an SPI control module 202, coupled with the variable filter, and configured to control one or more filter parameters of the variable filter, i.e. selecting the pattern of a filter and one or more filter parameters of the filter through a serial peripheral interface (SPI) control module, thereby satisfying system requirements of different bandwidths or different modes, which may support requirements of bandwidths in different conditions and improve the flexibility of usage.

As shown in FIG. 2, the above-mentioned SPI control module is coupled with the gain attenuation module, and configured to control one or more attenuation coefficients of the gain attenuation module. That is, the above-mentioned SPI may not only be responsible for controlling the filter, but also may control one or more parameters of the gain attenuation module according to a gain situation in a receiver so as to complete the adjustment on the magnitude of a signal.

Figure 3:
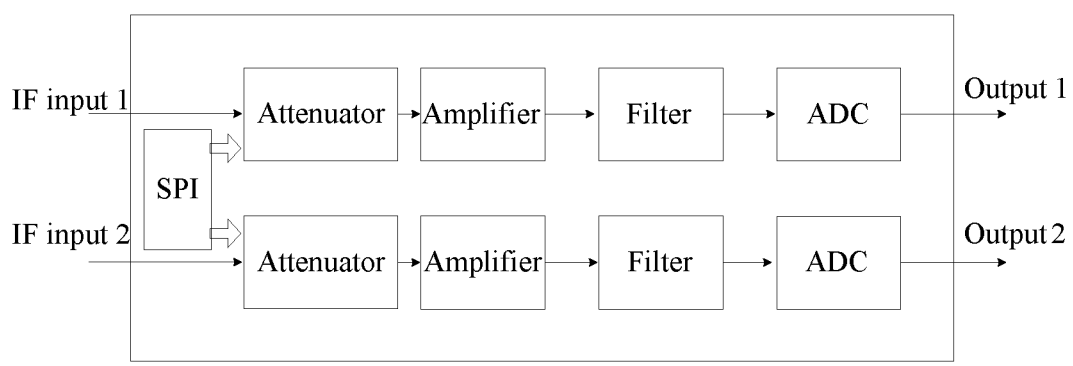
FIG. 3 is a further example structure diagram of an intermediate-frequency analogue-to-digital conversion device according to an embodiment of the disclosure.

In order to implement the intermediate-frequency analogue-to-digital conversion device in a dual-channel or multi-channel, two or more of the above-mentioned intermediate-frequency analogue-to-digital conversion device may be provided in one device, and these intermediate-frequency analogue-to-digital conversion devices may be controlled through one SPI control module. FIG. 3 shows an example structure diagram of an intermediate-frequency analogue-to-digital conversion device in a dual-channel. An attenuator (an embodiment of the above-mentioned gain attenuation module 102), an amplifier (an embodiment of the above-mentioned gain amplification module 104) and an analogue converter (an embodiment of the above-mentioned analogue-to-digital conversion module 108) are included. Through the device as shown in FIG. 3, an intermediate input 1 and an intermediate input 2 may be processed simultaneously so as to obtain an output 1 and an output 2, which realizes the processing on two groups of signals at the same time.

In an example embodiment, a differential analogue input interface and a digital output interface may be further provided on the above-mentioned analogue-to-digital conversion module, wherein the differential analogue input interface is configured to receive an intermediate-frequency analogue signal sent by the filter module, and the digital output interface is configured to send a digital signal which is obtained by analogue-to-digital conversion of the analogue-to-digital conversion module. The above-mentioned differential analogue input interface may use a differential circuit, and correspondingly, the digital output interface on the analogue-to-digital conversion module may be compatible with a JESD204B (Jedec Stand 204 protocol version B) interface and/or an LVDS (low-voltage differential signaling) interface. The technical effects of effectively limiting common mode interference and improving stray performance of a circuit are achieved. At the same time, using a serial peripheral interface may effectively decrease component pins and packaging size, which achieves the purpose of saving cost, decreases the requirements on the amount of pins of FPGA (field-programmable gate array), reduces the amount of traces in digital parts, and effectively reduces the trace area of a single-board printed circuit board (PCB).

In an example embodiment, a differential digital interface is provided on the above-mentioned analogue-to-digital conversion module, and configured to send a digital signal which is obtained through the analogue-to-digital conversion of the analogue-to-digital conversion module. The above-mentioned differential digital interface may be JES204B interface and/or LVDS interface.

A signal processed in the intermediate-frequency digital-to-analogue conversion device may be a signal obtained from a frequency mixer, i.e., an intermediate-frequency signal output by the frequency mixer is sent to the gain attenuation module of an intermediate-frequency digital-to-analogue conversion device and is subjected to the subsequent processing. In an example embodiment, the gain attenuation module is also connected to a frequency mixer, and configured to receive an intermediate-frequency signal output by the frequency mixer.

The above-mentioned inter-mediate digital-to-analogue conversion device may be used in wireless products of TDD (time division duplexing), and FDD (frequency division duplexing), i.e., the above-mentioned frequency mixer is a frequency mixer in a TDD system or FDD wireless product.

The above-mentioned intermediate-frequency digital-to-analogue conversion device may be used in a digital pre-distortion (DPD) feedback system, for example, the above-mentioned frequency mixer is a frequency mixer in the DPD feedback system.

In the above-mentioned each example embodiment, with regard to the above-mentioned intermediate-frequency digital-to-analogue conversion device, MCM technology may be used for packaging or RFIC technology may be used for packaging.

In an example embodiment of the disclosure, in a base station device of a wireless communication product, based on the MCM or RFIC technology, a single-chip integrated dual-channel intermediate-frequency reception device is provided. The device may directly convert an intermediate-frequency analogue input signal into a digital signal and output this digital signal. The gain may be adjusted, and filter width and sampling speed may be configured. In addition, FDD and TDD timeslot turning down functions are supported.

The device may be used in a super-heterodyne receiver of a base station product and a digital pre-distortion (DPD) reception link. In the processing of an analogue signal, a manner of first attenuation and then amplification may be used, which effectively guarantees linear performance of a link from a system design angle. In addition, the device may have a larger gain adjustment range, and the gain may range from 20 dB to −11.5 dB. For input analogue signals with different levels, by adjusting the attenuation module, the whole dynamic range is effectively improved.

With respect to a receiver intermediate-frequency technology in relevant technologies, the embodiment can simplify the design of the receiver intermediate-frequency part. As the requirements on platformization and multimode become higher and higher, in the embodiment of the disclosure, a filter between the gain amplification module and the analogue-to-digital converter (ADC) use the most advanced technology-tunable filter for realization, and in an example embodiment, the bandwidth of the filter may be selected through an SPI control module. This manner realizes the tunability of the filter coefficient, and improves the adaptability of the receiver and the uniform of a platform.

As shown in FIG. 3, the device provided by the embodiments of the disclosure is used for realizing the conversion from an analogue signal to a digital signal, which may be mainly composed of the following parts: a gain attenuation module, a gain amplification module, a filter module, an analogue-to-digital conversion module and an SPI control module. Functions realized by each module will be described in detail in the following.

1) A gain attenuation module (may be embodied as an attenuator), configured to perform attenuation on an input high-powered intermediate-frequency analogue signal, and control the magnitude of the signal;

2) a gain amplification module (may be embodied as an amplifier), mainly configured to complete power amplification of the signal;

3) a filter module (may be embodied as a filter), which may support bandwidth requirements of different conditions through a manner of selectable bandwidth filter, thus improving the flexibility of the device usage;

4) an analogue-to-digital conversion module (may be embodied as a digital-to-analogue converter), configured to convert a continuous analogue signal into a discrete digital signal;

5) an SPI control module (may be embodied as an SPI), configured to realize the adjustment on the gain and selection of the filter bandwidth.

The above-mentioned device may realize the following functions: in TDD time division operation, if a transmission channel works, but a reception channel does not work, then electric consumption of the internal gain amplification module may be controlled through a control pin of a module, which effectively saves power consumption.

An intermediate-frequency analogue interface in the above-mentioned device may be a differential input circuit. The signal may be transmitted by using a differential circuit manner, which may effectively limit common mode interference and improve stray performance of a circuit. In an example embodiment, a digital interface is provided, i.e. a port of the device configured to output a digital signal may be compatible with JESD204B and LVDS interfaces. Using a serial peripheral interface manner effectively decreases component pins and packaging size, and saves cost, and at the same time, the requirements on the amount of pins of FPGA are reduced, and the amount of traces in digital parts are reduced and the trace area of a printed circuit board (PCB) is effectively reduced.

The above-mentioned device may at most support an input analogue frequency range of 500M, an intermediate-frequency analogue bandwidth of 100M at most and a sampling frequency of 370M at most, which has a larger input level dynamic range and can support various wireless products, e.g., two modes of TDD and FDD are considered. In the TDD mode, considering transceiving time division work, it has a power consumption adjustment function and reaches the purpose of saving power. The module supports flexible configuration on any sampling speed which is less than a highest sampling speed, and at the same time, the bandwidth of a filter may be flexibly configured according to a corresponding sampling speed.

Compared with the related art, the above-mentioned device of the embodiments of the disclosure improves component integration degree through MCM or RFIC technology, and at the same time, saves PCB cost and component cost, reduces the complexity of design, and improves the reliability of products. The same PCB area may accommodate a larger amount of channels, which improves cost advantages of wireless transceivers to a certain degree, and improves the market competition of the products.

The implementation of the technical solution is further described below in details with reference to the drawings.

Through the intermediate-frequency analogue-to-digital conversion device as shown in FIG. 3, an intermediate-frequency analogue signal is directly converted into a digital signal and then output. For an analogue signal of intermediate frequency, a signal of a small power is amplified through an amplification module; while with regard to a signal of a high power, different attenuation values of an attenuation module are adjusted so that a whole gain of the module may be adjusted, and an input analogue level of an ADC is made to be within a working range. Through a filter module, the filter of different bandwidths may be flexibly selected, and requirements of different scenarios are supported. The ADC outputs a digital signal, and in an example embodiment, JES204B or LVDS output may be supported.

Figure 4:
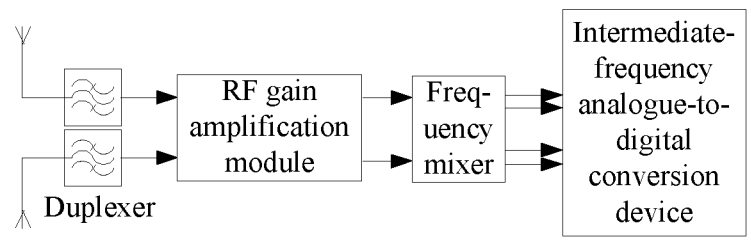
FIG. 4 is a schematic diagram showing the connection of an intermediate-frequency analogue-to-digital conversion device in a first application scenario according to an embodiment of the disclosure.
Figure 5:
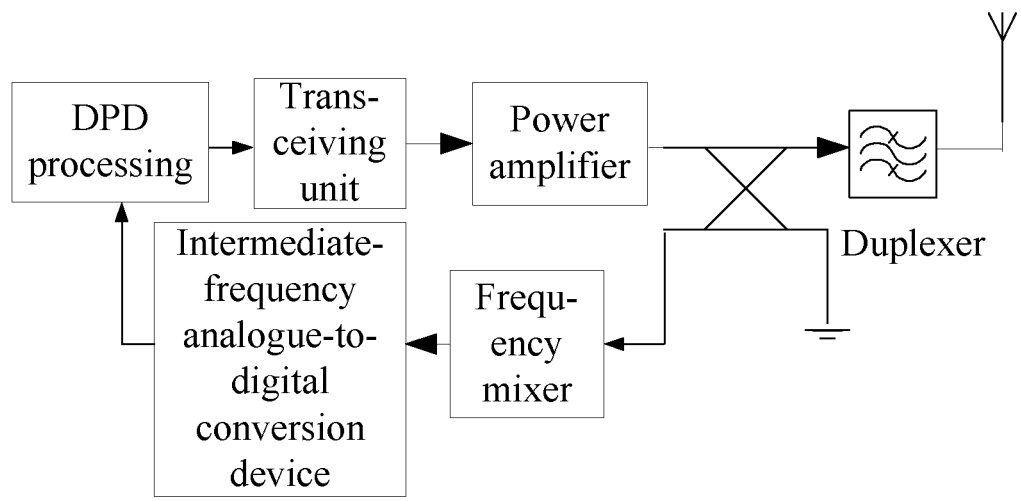
FIG. 5 is a schematic diagram showing the connection of an intermediate-frequency analogue-to-digital conversion device in a second application scenario according to an embodiment of the disclosure.

FIG. 4 and FIG. 5 show two application scenarios of the above-mentioned intermediate-frequency analogue-to-digital conversion device.

Application scenario 1): the above-mentioned intermediate-frequency analogue-to-digital conversion device is applied in a receiver system, and applied to wireless products of TDD, FDD, etc. As shown in FIG. 4, the suitable gain of the device is set according to the power of a received signal and an earlier gain situation of a receiver frequency mixer. If an input signal is a small signal, then the present device may be configured to be of zero attenuation so as to guarantee that the small signal is amplified enough to reach the requirement of demodulation threshold of a baseband. If the input signal is a large interference signal, then a suitable attenuation amount is set by the present device cooperating with a radio frequency circuit in front of the frequency mixer so as to enable the linear and NF of a receiver to reach optimum. With regard to TDD time division operation, if a transmission channel works, but a reception channel does not work, then a control pin of a module may be used to control the electric consumption of an internal gain amplification module, thereby reaching the purpose of effectively saving power consumption.

Application scenario 2): as shown in FIG. 5, the above-mentioned intermediate-frequency analogue-to-digital conversion device is applied to a DPD feedback system of TDD and FDD wireless products. The gain in the feedback system usually keeps unchanged, and the device may be provided with a suitable attenuation amount or no attenuation according to the signal level of a power amplifier of the receiver coupling to a feedback link. Since the linear of the device does not change with an attenuation value, the linear of a signal received by the feedback link would not be influenced due to the difference of attenuation values by using the device in the feedback system. In an example embodiment, the feedback link adopts a multi-stage distortion component of power amplification, and therefore a wider intermediate-frequency bandwidth is required, which is usually three to five times of a transmission bandwidth; and the device may correspondingly adjust the bandwidth of a low pass filter according to the requirements of a feedback bandwidth so as to satisfy the requirement of multimode platformization.

The above-mentioned intermediate-frequency analogue-to-digital conversion device provided in the embodiments can be used in both a TDD mode and an FDD mode, which realizes the requirements of sharing TDD and FDD platforms. In a TDD time division system, when a receiver does not work, a gain amplification module in the internal of the device may be powered off so as to save power consumption. No matter being used in the receiver or feedback system, the design of radio frequency links can be simplified, and the usage is more flexible. At the same time, using the integrated technology saves PCB area and reduces design costs.

It can be seen from the above-mentioned analysis that the embodiments of the disclosure can achieve the following effect. In the example embodiment, a variable filter is used in an intermediate-frequency analogue-to-digital conversion device; therefore, one or more parameters of a filter may be adjusted according to requirements of a system so as to satisfy different system requirements. Through this manner, the embodiments of the disclosure solve the technical problem in the related art that as a filter between a gain amplification module and an analogue-to-digital conversion module is non-tunable, there is a need to adjust the circuit constitution of an intermediate-frequency analogue-to-digital conversion device in systems of different modes or different frequency bands, and achieve the technical effect of improving the universality of the intermediate-frequency analogue-to-digital conversion device.

Although the above text describes the disclosure in detail, the disclosure is not limited to this, and a person skilled in the art may perform various modifications according to principles of the disclosure. Therefore, any modification made according to the disclosure shall fall within the protection scope defined by the claims of the disclosure.

The above description is only example embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope defined by the claims of the disclosure.

What is claimed is:

1. An intermediate-frequency analogue-to-digital conversion device, comprising: a gain attenuation module, a gain amplification module, a filter and an analogue-to-digital conversion module, wherein
   the gain attenuation module is configured to perform attenuation processing on a received intermediate-frequency signal;
   the gain amplification module is connected to the gain attenuation module, and configured to perform amplification processing on a signal that is output from the gain attenuation module;
   the filter is a variable filter, connected to the gain amplification module, and configured to perform filter processing on a signal that is amplified by the gain amplification module, and the variable filter is a filter of which one or more filter coefficients are tunable; and
   the analogue-to-digital conversion module is connected to the filter, and configured to convert a signal that is filtered by the filter into a digital signal.

2. The device according to claim 1, further comprising: a serial peripheral interface (SPI) control module, coupled with the variable filter, and configured to control the filter coefficient of the variable filter.

3. The device according to claim 2, wherein the SPI control module is coupled with the gain attenuation module, and is configured to control one or more attenuation coefficients of the gain attenuation module.

4. The device according to claim 1, wherein a differential analogue input interface and a digital output interface are provided on the analogue-to-digital conversion module, wherein the differential analogue input interface is configured to receive an intermediate-frequency analogue signal sent by the filter, and the digital output interface is configured to send a digital signal which is obtained by analogue-to-digital conversion of the analogue-to-digital conversion module.

5. The device according to claim 1, wherein the digital output interface is a Jedec Stand 204 protocol version B (JESD204B) interface and/or a low-voltage differential signal (LVDS) interface.

6. The device according to claim 1, wherein the gain attenuation module is also connected to a frequency mixer, and configured to receive an intermediate-frequency signal output by the frequency mixer.

7. The device according to claim 6, wherein the frequency mixer is a frequency mixer in a time division duplex (TDD) or frequency division duplex (FDD) wireless product.

8. The device according to claim 6, wherein the frequency mixer is a frequency mixer in a digital pre-distortion (DPD) feedback system.

9. The device according to claim 1, wherein packaging is performed by using a multi-chip model system (MCM) technology or a radio frequency integrated circuit (RFIC) technology.

10. The device according to claim 2, wherein a differential analogue input interface and a digital output interface are provided on the analogue-to-digital conversion module, wherein the differential analogue input interface is configured to receive an intermediate-frequency analogue signal sent by the filter, and the digital output interface is configured to send a digital signal which is obtained by analogue-to-digital conversion of the analogue-to-digital conversion module.

11. The device according to claim 3, wherein a differential analogue input interface and a digital output interface are provided on the analogue-to-digital conversion module, wherein the differential analogue input interface is configured to receive an intermediate-frequency analogue signal sent by the filter, and the digital output interface is configured to send a digital signal which is obtained by analogue-to-digital conversion of the analogue-to-digital conversion module.

12. The device according to claim 2, wherein the digital output interface is a Jedec Stand 204 protocol version B (JESD204B) interface and/or a low-voltage differential signal (LVDS) interface.

13. The device according to claim 3, wherein the digital output interface is a Jedec Stand 204 protocol version B (JESD204B) interface and/or a low-voltage differential signal (LVDS) interface.

14. The device according to claim 2, wherein packaging is performed by using a multi-chip model system (MCM) technology or a radio frequency integrated circuit (RFIC) technology.

15. The device according to claim 3, wherein packaging is performed by using a multi-chip model system (MCM) technology or a radio frequency integrated circuit (RFIC) technology.

* * * * *